G. D. ROLLINS.
METALLIC PACKING.
APPLICATION FILED NOV. 12, 1907.
905,103.
Patented Nov. 24, 1908.
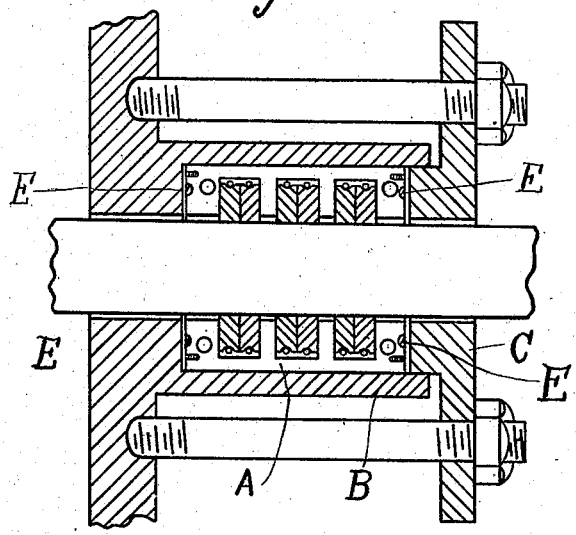
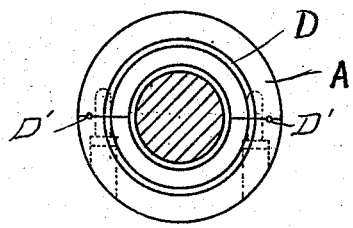
WITNESSES
INVENTOR
George D. Rollins
BY
ATTORNEY

UNITED STATES PATENT OFFICE.

GEORGE D. ROLLINS, OF PHILADELPHIA, PENNSYLVANIA.

METALLIC PACKING.

No. 905,103. Specification of Letters Patent. Patented Nov. 24, 1908.

Application filed November 12, 1907. Serial No. 401,805.

*To all whom it may concern:*

Be it known that I, GEORGE D. ROLLINS, a citizen of the United States, residing at Philadelphia, county of Philadelphia, and State of Pennsylvania, have invented a certain new and useful Improvement in Metallic Packing, of which the following is a specification.

My invention relates to a new and useful improvement in metallic packing, and has for its object to provide an exceedingly simple and effective arrangement for making steam-tight joints between the ends of the ring casing and the bottom of the stuffing box and the inner surface of the follower, thereby preventing the leakage of steam and waters of condensation around said casing.

With these ends in view, this invention consists in the details of construction and combination of elements hereinafter set forth and then specifically designated by the claim.

In order that those skilled in the art to which this invention appertains may understand how to make and use the same, I will describe its construction in detail, referring by letter to the accompanying drawing forming a part of this specification, in which—

Figure 1 is a section of a stuffing box follower and packing ring casing fitted within said stuffing box showing the manner of making the steam tight joints, and Fig. 2, an end view of the ring casing showing the groove therein for the reception of the packing strip.

In carrying out my invention as here embodied, A represents the ring casing which is fitted within the stuffing box B and held in place by the follower C and in each end of this casing is formed a circular groove D into which is fitted a malleable strip or wire E, which when pressure is put upon the follower by the nuts being run upon the stud bolts these malleable strips are swaged or flattened out upon the bottom of the stuffing box and upon the inner surface of the follower, thus making an absolutely steam and water tight joint.

In practice I prefer to use copper wire for the strips E but it is obvious that they might be made of lead wire or other suitable material which would be sufficiently compressible to flatten out when pressure was put thereon, and yet sufficiently stable to prevent leakage under steam pressure.

By the use of my improvement the necessity for using gasket rings or the like for making joints between the ends of the ring casing of metallic packing is obviated, and while considerable economy is effected a very much more substantial and durable joint is formed.

As depicted in Fig. 2, casing A, is formed in two sections which at their meeting faces are provided with longitudinal registering grooves D', which are located intermediate the inner circumference and the periphery of casing A, these grooves being filled with compressible soft metal packing rods of the same material as rings E.

Having thus fully described my invention, what I claim as new and useful, is—

In combination with a stuffing box having a bottom, a casing formed of two sections arranged in said box, said casing having each of its ends formed with an annular centrally arranged groove, a compressible soft metal packing having one side face seated in each groove and having their opposite side faces extending beyond said casing, the projecting side face of one of said rings engaging the bottom of the stuffing box and being adapted to be flattened out thereagainst, a follower having a part to engage in said stuffing box which part on its inner face is for engagement with the projecting side face of the other of said rings, the meeting faces of said sections being formed with longitudinal registering grooves intermediate their inner circumferences and their peripheries, and compressible soft metal packing rods seating in said registering longitudinal grooves, said longitudinal grooves terminating beyond the peripheries of said annular grooves.

In testimony whereof, I have hereunto affixed my signature in the presence of two subscribing witnesses.

GEORGE D. ROLLINS.

Witnesses:
 EDW. W. AUSTIN,
 S. M. GALLAGHER.